(12) United States Patent
Tseng

(10) Patent No.: US 8,196,396 B1
(45) Date of Patent: Jun. 12, 2012

(54) COMPACT DESIGN OF USING INSTREAM RIVER FLOW AND/OR PUMP DISCHARGE FLOW TECHNOLOGY ADDED TO DIFFERENTIALS BETWEEN HEAD WATER AND TURBINE LOCATION

(76) Inventor: Alexander A. Tseng, Palo Alto, CA (US)

( * ) Notice: Subject to any disclaimer, the term of this patent is extended or adjusted under 35 U.S.C. 154(b) by 698 days.

(21) Appl. No.: 12/252,751

(22) Filed: Oct. 16, 2008

Related U.S. Application Data

(60) Provisional application No. 60/980,415, filed on Oct. 16, 2007.

(51) Int. Cl.
*F03B 13/08* (2006.01)
*F03B 15/00* (2006.01)
(52) U.S. Cl. .......................... 60/398; 290/54
(58) Field of Classification Search .............. 60/398; 290/43, 54
See application file for complete search history.

(56) References Cited

U.S. PATENT DOCUMENTS

| | | | |
|---|---|---|---|
| 1,083,995 A | 1/1914 | Davis | |
| 2,783,392 A | 2/1957 | Corbiere | |
| 4,078,388 A | 3/1978 | Atencio | |
| 4,117,676 A | 10/1978 | Atencio | |
| 4,143,990 A | 3/1979 | Atencio | |
| 4,149,092 A | 4/1979 | Cros | |
| 4,165,467 A | 8/1979 | Atencio | |
| 4,182,123 A * | 1/1980 | Ueda | 60/398 |
| 4,188,788 A | 2/1980 | Eller | |
| 4,224,526 A | 9/1980 | Margison et al. | |
| 4,288,985 A | 9/1981 | Dyck | |
| 4,311,410 A | 1/1982 | Gutierrez Atencio | |
| 4,319,142 A | 3/1982 | Mayo, Jr. | |
| 4,324,984 A | 4/1982 | Borgren | |
| 4,335,319 A | 6/1982 | Mettersheimer, Jr. | |
| 4,345,159 A | 8/1982 | Gutierrez Atencio | |
| 4,352,989 A | 10/1982 | Gutierrez Atencio | |
| 4,364,228 A | 12/1982 | Eller | |
| 4,475,334 A * | 10/1984 | Kuwabara | 60/398 |
| 4,476,396 A | 10/1984 | Calvert, Jr. | |
| 4,540,313 A | 9/1985 | Broome | |
| 4,629,904 A * | 12/1986 | Rojo et al. | 60/398 |
| 4,746,244 A | 5/1988 | Broome | |
| 4,941,771 A * | 7/1990 | Perper | 405/78 |
| 6,208,037 B1 | 3/2001 | Mayo, Jr. et al. | |
| 6,267,551 B1 * | 7/2001 | Dentinger | 415/3.1 |
| 6,359,347 B1 * | 3/2002 | Wolf | 290/54 |

(Continued)

OTHER PUBLICATIONS

Bolinger, et al. "Clean Energy Funds: An Overview of State Support for Renewable Energy", Office of Power Technologies of the U.S. Department of Energy, Apr. 2001, 121 pages.

(Continued)

*Primary Examiner* — Thomas E Lazo
(74) *Attorney, Agent, or Firm* — Knobbe, Martens, Olson & Bear, LLP

(57) ABSTRACT

Systems and methods for using instream water flow velocity to increase hydro turbine output is provided. In one implementation, the system and method are adapted to harness the kinetic energy in flowing water, preferably in waste water spilling over low-head dams or flowing from pump discharge at reservoir pumping stations, and using such energy in conjunction with differentials between head water and turbine location to improve turbine output. In certain implementations, the novel technology can be used to establish dispersed small-scale hydroelectric generation units at existing low-head dams. Preferably, the dispersed small-scale hydroelectric generation units can be connected to the existing power grid, thus providing a new source of sustainable alternative energy.

12 Claims, 7 Drawing Sheets

U.S. PATENT DOCUMENTS

| | | |
|---|---|---|
| 6,431,821 B1 | 8/2002 | Feltenberger et al. |
| 6,454,546 B1 * | 9/2002 | Huang .............................. 60/398 |
| 6,546,723 B1 | 4/2003 | Watten et al. |
| 6,606,857 B1 * | 8/2003 | Simonds ......................... 60/398 |
| 7,084,521 B1 * | 8/2006 | Martin ............................ 290/54 |
| 2003/0039512 A1 | 2/2003 | Bethune |
| 2003/0066289 A1 | 4/2003 | Watten et al. |

OTHER PUBLICATIONS

Stantucci, Jr., et al. "Fox River Fish Passage Feasibility Study: Summary Report", Max McGraw Wildlife Foundation, Apr. 2003, 8 pages.

* cited by examiner

COMPACT DESIGN OF USING INSTREAM RIVER FLOW AND/OR PUMP DISCHARGE FLOW TECHNOLOGY ADDED TO DIFFERENTIALS BETWEEN HEAD WATER AND TURBINE LOCATION

CROSS-REFERENCE TO RELATED APPLICATIONS

This application claims the benefit of priority under 35 U.S.C. §119(e) of U.S. Provisional Application No. 60/980, 415 filed on Oct. 16, 2007 and entitled COMPACT DESIGN OF USING INSTREAM RIVER FLOW TECHNOLOGY ADDED TO DIFFERENTIALS BETWEEN HEAD WATER AND TURBINE LOCATION, the entirety of which is incorporated herein by reference.

BACKGROUND OF THE INVENTION

1. Field of the Invention

The present inventions generally relate to small scale hydroelectric generation systems, and more particularly, relate to compact and low profile designs for use in conjunction with low-head dams or reservoir pump house discharges to generate hydroelectric power.

2. Description of the Related Art

Hydroelectric power is generated using water as an energy source, which is generally preferred over coal burning or other non-renewable forms of energy. Large hydroelectric plants have been built on numerous river systems in the United States. Many of these river systems also have existing low-head dams where tons of waste water spill over the dam on a daily basis. However, energy in the waste water spilling over the thousands of existing low-head dams has not been generally viewed as a renewable energy source. The idea that hydroelectric plants could only be feasibly built in large scale limited the exploration for this kind of renewable energy. Further, conventional low-head turbine generating units are usually built with the inlet water entering from the bottom of the dam or near riverbed where the water flow velocities in most cases are near zero. The conventional designs thus preclude their use for harnessing the energy in water spilling over low-head dams. Similarly, energy in the pump discharge flow from reservoir pump houses also has not been recognized as a renewable energy source due in large part to the lack of suitable and cost-effective technology. However, the recent rise in oil prices coupled with increased concerns over the adverse impact of green house effect have engendered a renewed sense of urgency in the utility industry to search for new types of sustainable alternative energy. As such, a low cost and easy-to-implement system and method that can be used to tap into and harness the energy in waste water spilling over low-head dams and in pump discharge flow from reservoir pump houses would greatly benefit the search for sustainable alternative energy.

SUMMARY OF THE INVENTION

The methods, devices, and systems of the invention each have several aspects, no single one of which is solely responsible for its desirable attributes. Without limiting the scope of this invention, its more prominent features will now be discussed briefly. After consideration of this discussion and particularly after reading the section entitled "Detailed Description of Preferred Embodiments," one will understand how the features of the invention provide advantages that include, for example, a technology related to hydroelectric generation that has low environmental impact, good aesthetics, and requires low maintenance and low cost construction.

Certain preferred embodiments of the present invention provide a method of using instream river water flow velocity to increase turbine output. In one embodiment, the method comprises capturing the kinetic energy in flowing river water, preferably in water spilling over low-head dams, and using such energy in conjunction with differentials between head water and turbine location to improve turbine output. In certain implementations, the novel technology can be used to establish dispersed small-scale hydroelectric generation units at existing low-head dams. Preferably, the dispersed small-scale hydroelectric generation units can be connected to the existing power grid, thus providing a new source of sustainable alternative energy.

It is generally understood that river water velocity is a function of the river depth with the velocity being highest near the surface and lowest near the riverbed. In one embodiment of the invention, the method comprises positioning an intake of a turbine generator below the river water surface at a point where the water velocity is greater than the water velocity at or near the riverbed, or near the bottom of a dam. In another embodiment, the method comprises positioning an intake of a turbine generator above the river bed at a point where the velocity of the water is greater than where conventional intakes are typically positioned. In one implementation, the method comprises positioning an intake of a turbine generator at a river depth having a water flow velocity that is greater than that near the riverbed, preferably about 10%, 20%, 30%, 40%, 50%, 60%, 70%, 80%, 90%, or 100% greater than the water velocity at about or near the river bed where conventional intakes are typically positioned. In another implementation, the method comprises positioning an intake of a turbine generator at a river depth where the water flow velocity is more than 100% greater than the water velocity adjacent to or near the river bed where conventional intakes are typically positioned. In yet another implementation, the method comprises positioning an intake of a turbine generator sufficiently above the river bed at a position that allows water spilling over low-head dams to flow into the intake.

In another implementation, the method further comprises positioning the turbine generator at an elevation below the intake and using vacuum to siphon flowing water over the dam to utilize the kinetic energy added to the potential energy available from the elevation drop between upper and lower reservoirs to increase the total turbine output. In another implementation, the method comprises providing a draft tube on the downstream side. The draft tube is preferably designed to further improve the unit performance by providing the suction at the discharge end to reduce instream pressure losses. In one implementation, the method comprises utilizing the energy from the flowing water in conjunction with vacuum technology to establish the velocity heads which are added to the head drops over the existing dam. In some embodiments, the method further includes providing an intake structure that transforms from a square flat configuration to circular configuration that preferably spirals down to the turbine runner.

The methods of certain preferred embodiments take advantage of the kinetic energy in the directional flow of water in a river to build a velocity head. In one embodiment, the method comprises placing the intake of a low-head turbine generating unit below the river water surface, where the current is preferably strong or the strongest, so as to gain velocity head. In one implementation, the water intake is positioned a few inches below the river water surface, preferably 1-20 inches. However, it will be appreciated that the position of the intake is not limited to the above-described depths. In certain embodiments, the method comprises placing the intake above the river bed at a depth where the water flow velocity is greater than the flow velocity at or near the riverbed so that it takes advantage of the current flow.

Another preferred embodiment of the present invention provides a compact, low-profile instream flow turbine generator system. The system comprises a turbine and a low-profile intake system adapted to reduce water velocity loss and facilitate positioning of the intake system over existing low-head dams. In one embodiment, the intake system comprises a penstock having a substantially square, flat configuration at a proximal end and transitions to a circular configuration at a distal end. In another embodiment, grating and screens are positioned on the front end of the system to keep out debris and the like. In another embodiment, the system further comprises a vacuum siphon to assist in drawing water into the system. The penstock is preferably designed to be positioned over the dam in certain embodiments, which substantially minimizes the impact on existing dams and increases the power output with an improved net head. In one implementation, the intake system preferably comprises a low profile penstock positioned above the dam having a circular tube leading to a turbine runner chamber. The configuration of the intake system is preferably adapted to reduce the loss of fluid velocity as water travels through the system.

Another preferred embodiment of the present invention provides a method of modifying existing low-head, hydroelectric plants to take advantage of instream flow technology. The method comprises positioning one or more small-scale hydroelectric units to capture the kinetic energy present in the water spilling over the low-head dam. The method comprises positioning the intake of each turbine generator upstream at a location where water flow velocity is higher than that at or near the riverbed. Preferably, the intake is positioned right below the river surface. In one embodiment, the method further comprises positioning a small, compact, and low profile turbine generator downstream at an elevation below the intake.

Certain other preferred embodiments of the present invention provide a method of using pump discharge flow velocity from reservoir pumping stations to increase turbine output. In one embodiment, the method comprises harnessing the kinetic energy in pump discharge flow and using such energy in conjunction with differentials between head water and turbine location to increase turbine output. In one implementation, the method comprises positioning the intake of a turbine generator instream a pump discharge flow at pumping stations and positioning the turbine generator at an elevation lower than the intake. Preferably, the kinetic energy in the pump discharge flow in conjunction with the differentials between head water and turbine location increase the total turbine output. In one embodiment, the intake structure comprises a square flat configuration that transforms to a circular configuration and preferably spirals down to the turbine runner.

BRIEF DESCRIPTION OF THE DRAWINGS

These and other features, aspects, and advantages of the systems disclosed herein are described below with reference to the drawings of preferred embodiments, which are intended to illustrate and not to limit the invention. Additionally, from figure to figure, the same reference numerals have been used to designate the same components of an illustrated embodiment. The following is a brief description of each of the drawings.

DETAILED DESCRIPTION OF THE PREFERRED EMBODIMENTS

Figure 1:
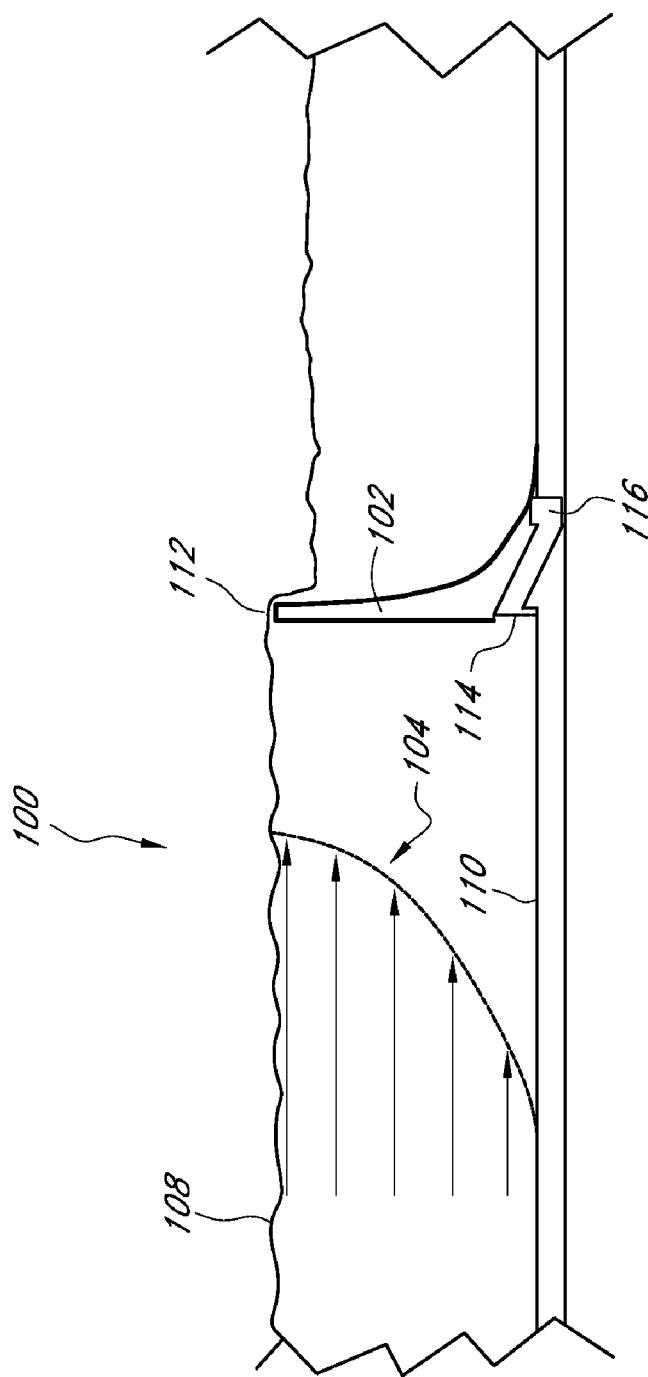
FIG. 1 is a schematic illustration of a cross-sectional view of a river system having a low-head dam built thereon.

FIG. 1 schematically illustrates a sectional view of a river system 100 having a conventional low-head dam 102 built thereon. FIG. 1 also schematically illustrates a river water flow velocity profile 104, showing that the water velocity is a function of depth such that water velocity near or adjacent to the river surface 108 is the greatest and water velocity near or adjacent to the riverbed 110 is the lowest. As shown in FIG. 1, the intake 114 for a conventional low-head turbine generating unit 116 is located adjacent to the riverbed 110 where water velocity is the lowest, or near zero in some cases. While a portion of the water enters the intake of the turbine generating unit, directional river flow causes residual water to spill over the top 112 of the dam 102 on a constant basis.

Figure 2:
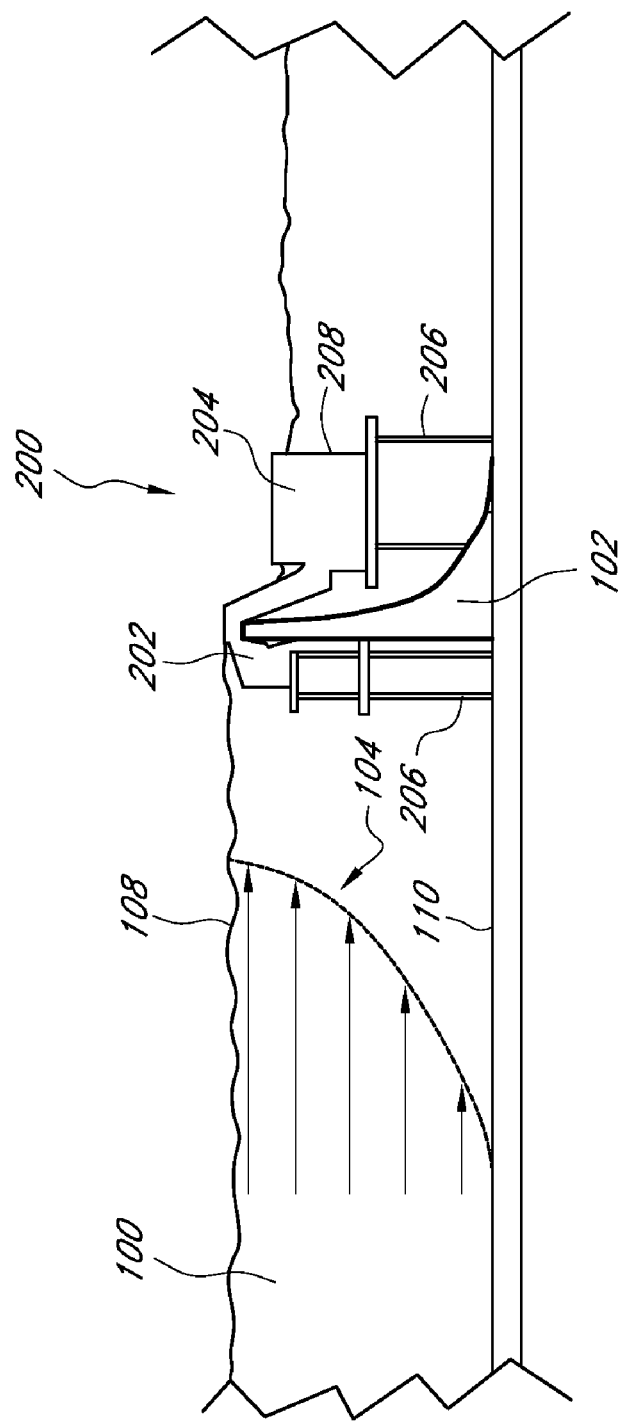
FIG. 2 is a schematic illustration of a cross-sectional view of a compact, low profile hydroelectric generator system of one preferred embodiment used in connection with a low-head dam.

FIG. 2 schematically illustrates a compact, low profile hydroelectric generator system 200 of a preferred embodiment configured to be used in conjunction with a low-head dam to harness the energy in the waste water spilling over the dam. The system 200 is preferably positioned instream in a manner such that instream water flow velocity is utilized to increase turbine output. In the embodiment shown in FIG. 2, the system 200 is installed adjacent to an existing low-head dam 102 in a manner so as to harness the kinetic energy in water spilling over the low-head dam 102 and use such energy in conjunction with differentials between head water and turbine location to improve turbine output.

As shown in FIG. 2, the system 200 generally comprises an intake 202, a turbine and generator 204 housed inside a low profile turbine runner chamber, and support structures 206 for positioning the system at an elevation above the riverbed 110. The intake 202 is preferably in fluid communication with the turbine 204. In a preferred embodiment, the intake 202 is positioned upstream and near the surface 108 of the river 100 where the water velocity is much higher than that at the river bed 110. In one implementation, the intake 202 of the system 100 is positioned at a river depth having a water flow velocity that is greater than that at about or near the riverbed where conventional intakes are typically positioned. The water velocity at the intake 202 is preferably about 10%, 20%, 30%, 40%, 50%, 60%, 70%, 80%, 90%, or 100% greater than the water velocity at about or near the river bed. In another implementation, the intake 202 of the system 100 is positioned at a river depth where the water flow velocity is more than 100% greater than the water velocity adjacent to near the river bed. In yet another implementation, the intake 202 is positioned sufficiently above the river bed at a position that allows at least some of the water spilling over the low-head dam 102 to flow into the intake 202. In yet another implementation, the intake 202 is positioned a few inches below the river surface 108, where the current is strong or the strongest so as to gain velocity head. In certain implementations, the intake 202 is positioned about 1-20 inches below the river surface 108. In yet another implementation, the intake 202 is positioned at a level where the river water velocity is between 500 to 5000 cubic feet per second. In certain preferred embodiments, the support structure is height adjustable so as to accommodate various elevation levels desired for the intake. Preferably, the positioning of the intake 202 takes advantage of the kinetic energy in the directional flow of water in the river to build a velocity head.

As FIG. 2 further shows, the turbine 204 is positioned downstream and at an elevation below the intake 202 so that there is a height differential or head drop between the intake and the turbine. In some embodiments, vacuum is used to siphon flowing water over the dam 102 to establish the velocity heads which are added to the head drops over the existing dams. In some implementations, the system 200 further comprises a draft tube 208 adapted to further improve the system performance by providing suction at the discharge end to reduce instream pressure losses. The turbine and generator can be any conventional turbine system used in hydroelectric generation. In one embodiment, the turbine system is a Type-S turbine with generator.

In practice, water near the river surface 108 that would normally spill over the dam 102 would flow into the intake 202 and to the turbine 204 to drive the turbine and generate electricity. The location of the intake is selected to take advantage of the water velocity by harnessing the kinetic energy in flowing river water and using such energy in conjunction with differentials between head water and turbine location to improve turbine output. Thus, the system is not only useful in converting otherwise waste water energy into hydroelectric power but can do so more efficiently than conventional hydroelectric units.

The system 200 can be installed at existing low-head dam sites and supplement the power generation of existing low-head hydroelectric power generators. In certain embodiments, multiple systems can be installed at low-head dams to form dispersed small scale hydroelectric generation units. In some implementations, the dispersed units can be connected to an existing power grid, thus providing a new source of sustainable alternative energy.

Figure 3:
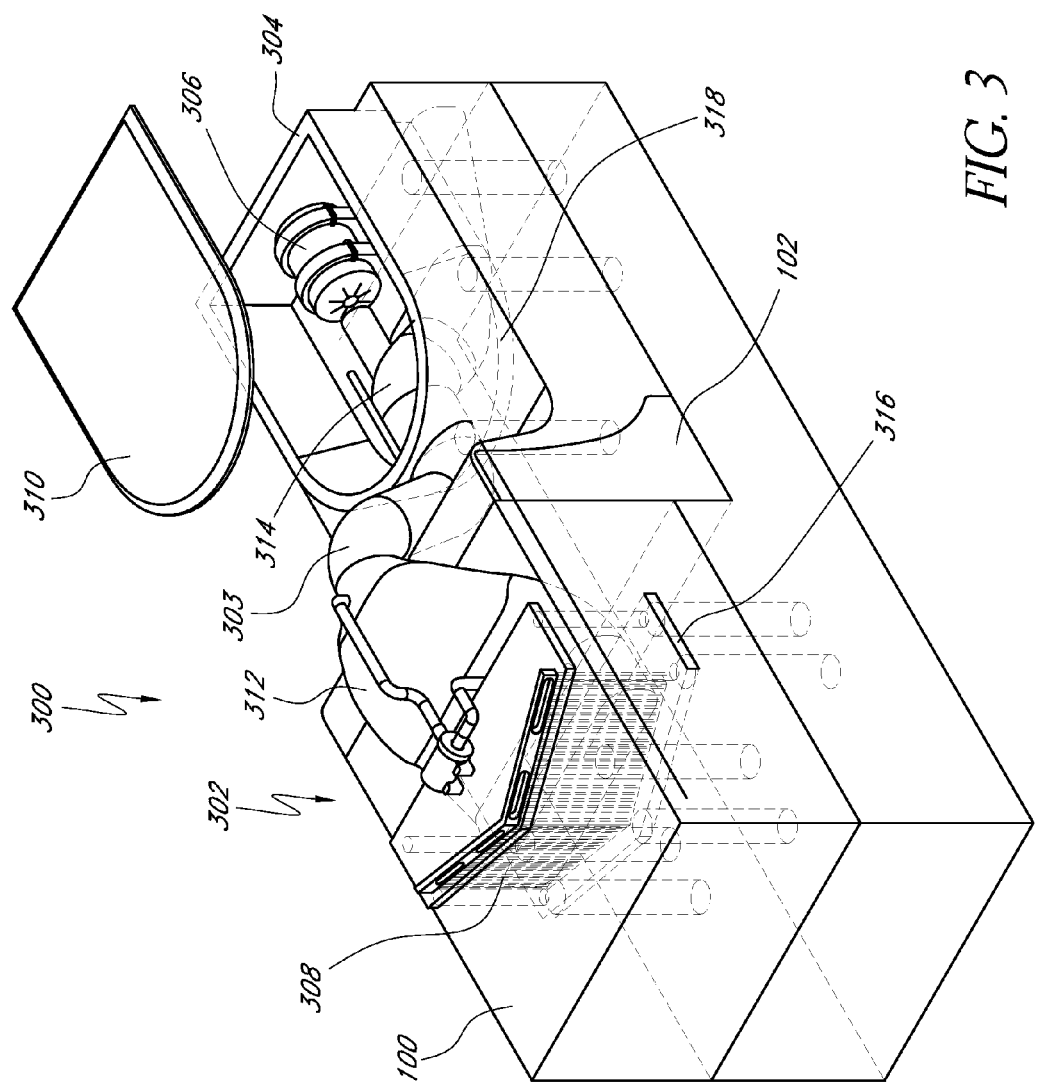
FIG. 3 is a front perspective view of a compact, low profile hydroelectric generator system of one preferred embodiment.

FIG. 3 is a front perspective view of a preferred embodiment of a compact, low profile turbine generator system 300 according to the present invention. The system 300 is adapted to be mounted adjacent to a low-head dam 102 in a river or reservoir 100 which are illustrated in phantom lines. As shown in FIG. 3, the system 300 generally comprises a low profile water intake assembly 302, a turbine runner chamber 304, and a turbine generator 306 positioned therein. In the embodiment shown in FIG. 3, the intake assembly 302 comprises an opening sized to receive river water flow, a penstock 303 having a substantially square, flat configuration at a proximal end 312 and transitions to a circular configuration at a distal end 314 leading to the turbine runner chamber 304. Transitions from a square and flat configuration to a circular configuration advantageously affect the vortex of the water flow such that velocity loss is substantially reduced.

The system is designed to substantially minimize the total loss of the intake system by optimizing the body style with a lower profile penstock shape above the dam and circular path to the turbine runner chamber. The losses in siphon intake come mainly from curves along the penstock path. Not all fluid particles travel at the same velocity within the penstock. Especially around the curves, the flow distribution is very complex. The losses in the bends include changes in flow direction (turbulence), flow velocity at boundaries, centrifugal forces and friction losses. The configuration of the system is adapted to reduce flow velocity losses at individual subsections in order to minimize the total water head loss coefficient. The low profile configuration of the system facilitates positioning of the system over existing low-head dams and reduces velocity loss.

As also shown in FIG. 3, angled gratings and screens 308 are positioned adjacent to the opening of the intake assembly 302 to keep out debris and the like. As further shown in FIG. 3, the turbine runner chamber 304 has a flattened profile and has a cover 310 that is adapted to cover the chamber opening. Additionally, support platforms 316, 318 can be constructed on both sides of the dam 102 to elevate the intake and the turbine runner chamber to a height that is near, at, or above the surface of the river.

Figure 4:
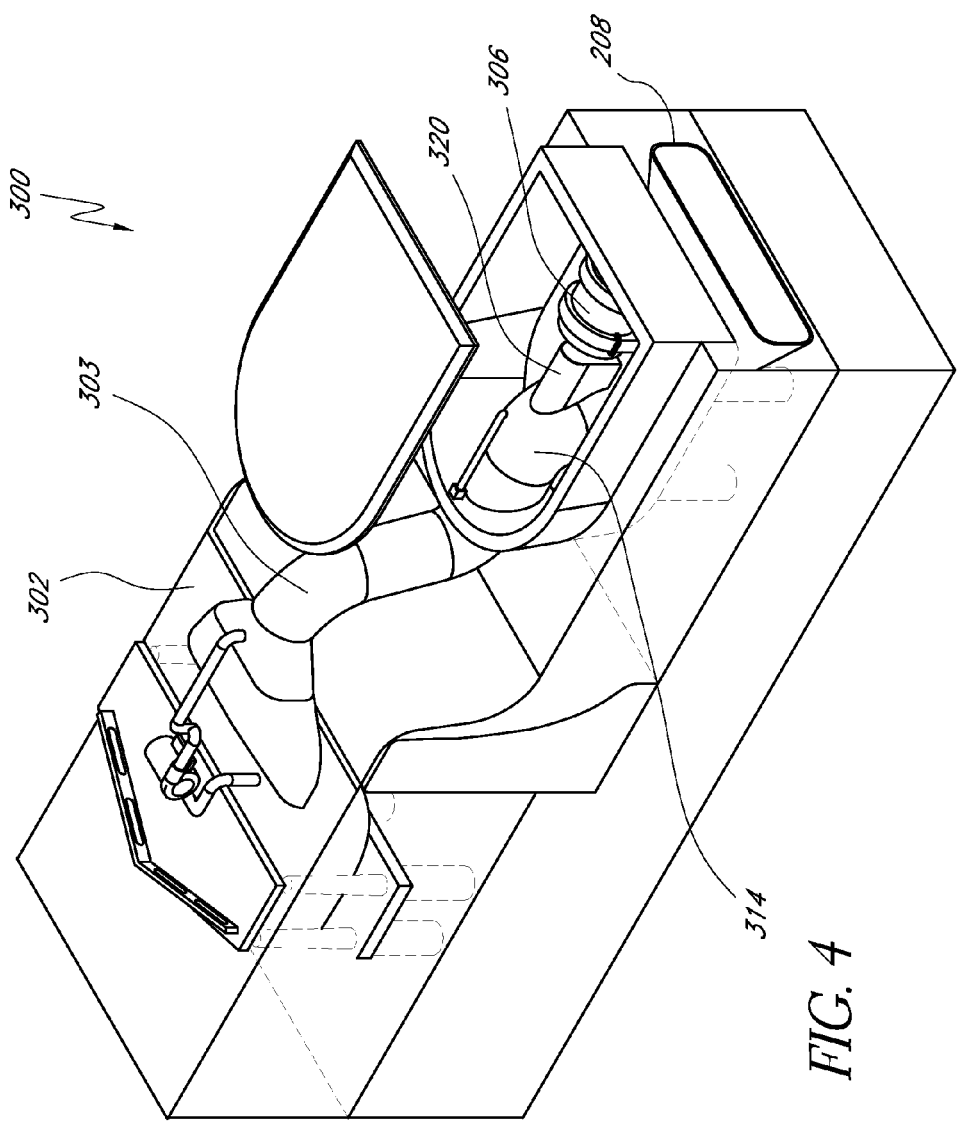
FIG. 4 is a rear perspective view of the compact, low profile hydroelectric generator system shown in FIG. 3.
Figure 5:
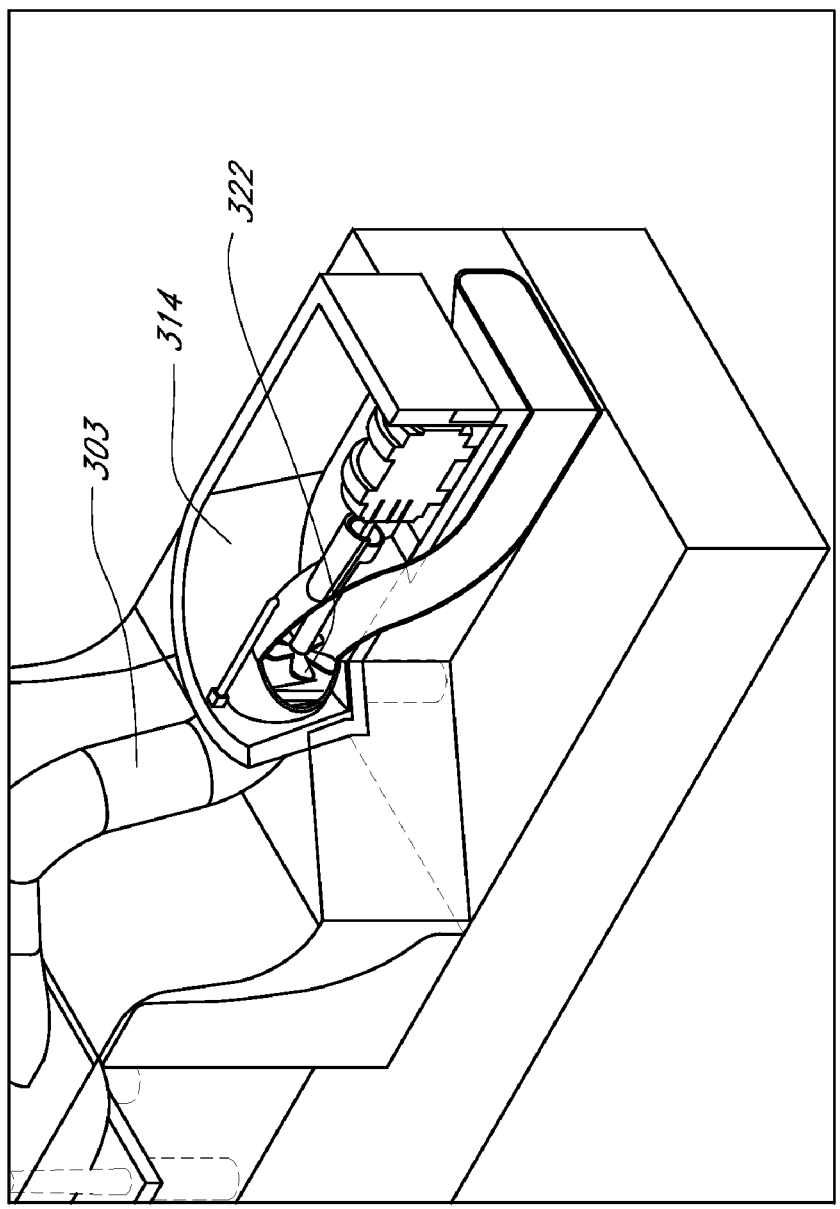
FIG. 5 is a cut-away view of the distal end of the penstock and the turbine runner chamber of the hydroelectric generator system shown in FIG. 3.
Figure 6:
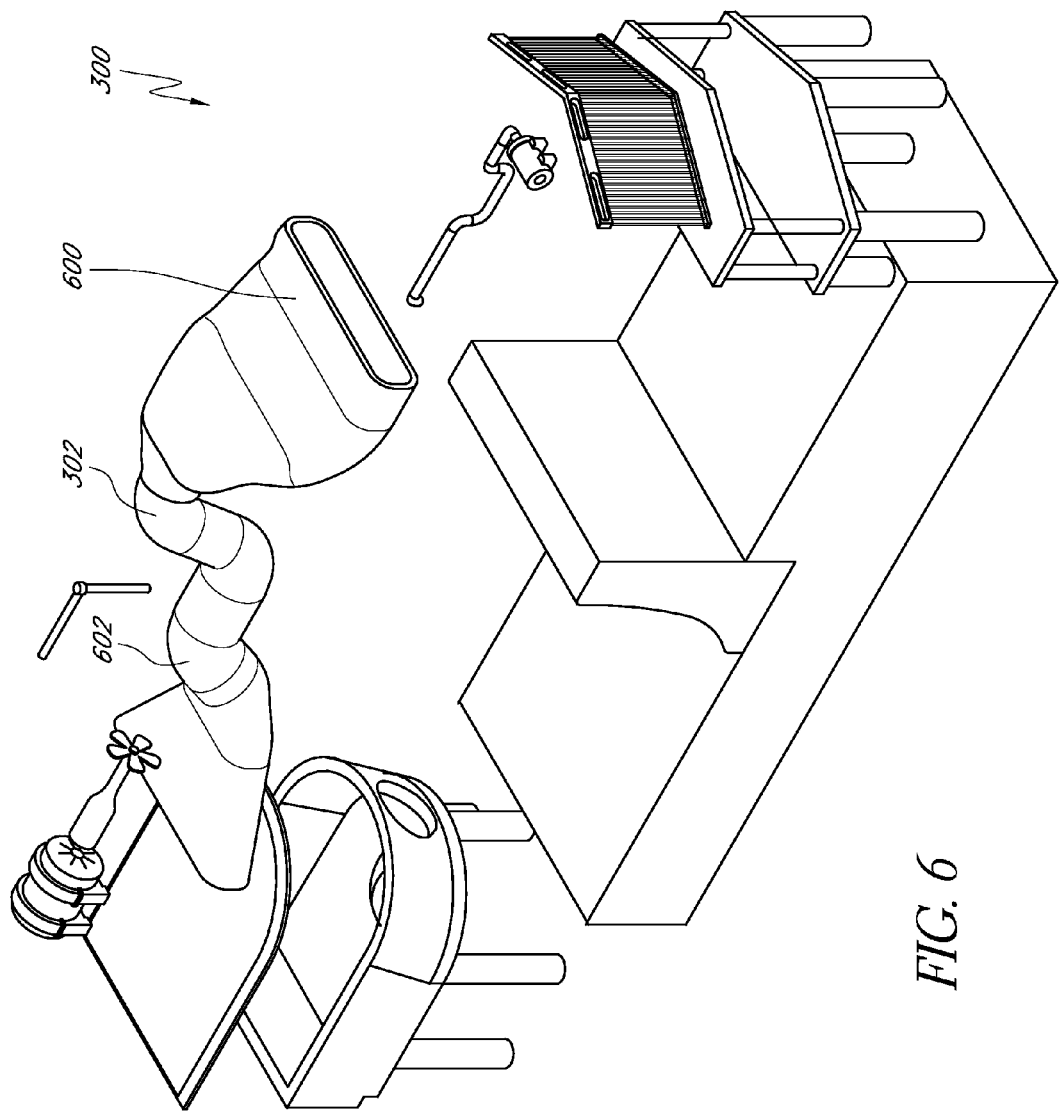
FIG. 6 is an exploded view of the hydroelectric generator system shown in FIG. 3.

FIG. 4 provides a rear perspective view of the compact, low profile turbine generator system 300. The turbine runner (not shown) is positioned inside the distal end 314 of the penstock and is coupled to the turbine runner via a shaft 320 as illustrated in FIG. 4. At least a portion of the spilled-over waste water is directed to flow from the opening in the intake 302 to the distal end 314 of the penstock 303 where the turbine runner is located. The residual water is released from the draft tube 208. In some embodiments, vacuum is used to siphon flowing water over the dam to utilize the kinetic energy added to the potential energy available from the elevation drop between intake opening and turbine generator to increase the total turbine output. FIG. 5 is a cut-away view of the distal end 314 of the penstock 303, showing the turbine runner 322 disposed therein. FIG. 6 illustrates an exploded view of the system 300, showing the intake assembly 302 as having a curved profile and comprising a substantially flattened and rectangular first portion 600 and transitioning to a circular second portion 602. In one embodiment, at least two sections of the penstock are disposed at an angle relative to each other, preferably at an angle of between 90 and 120 degrees.

Figure 7:
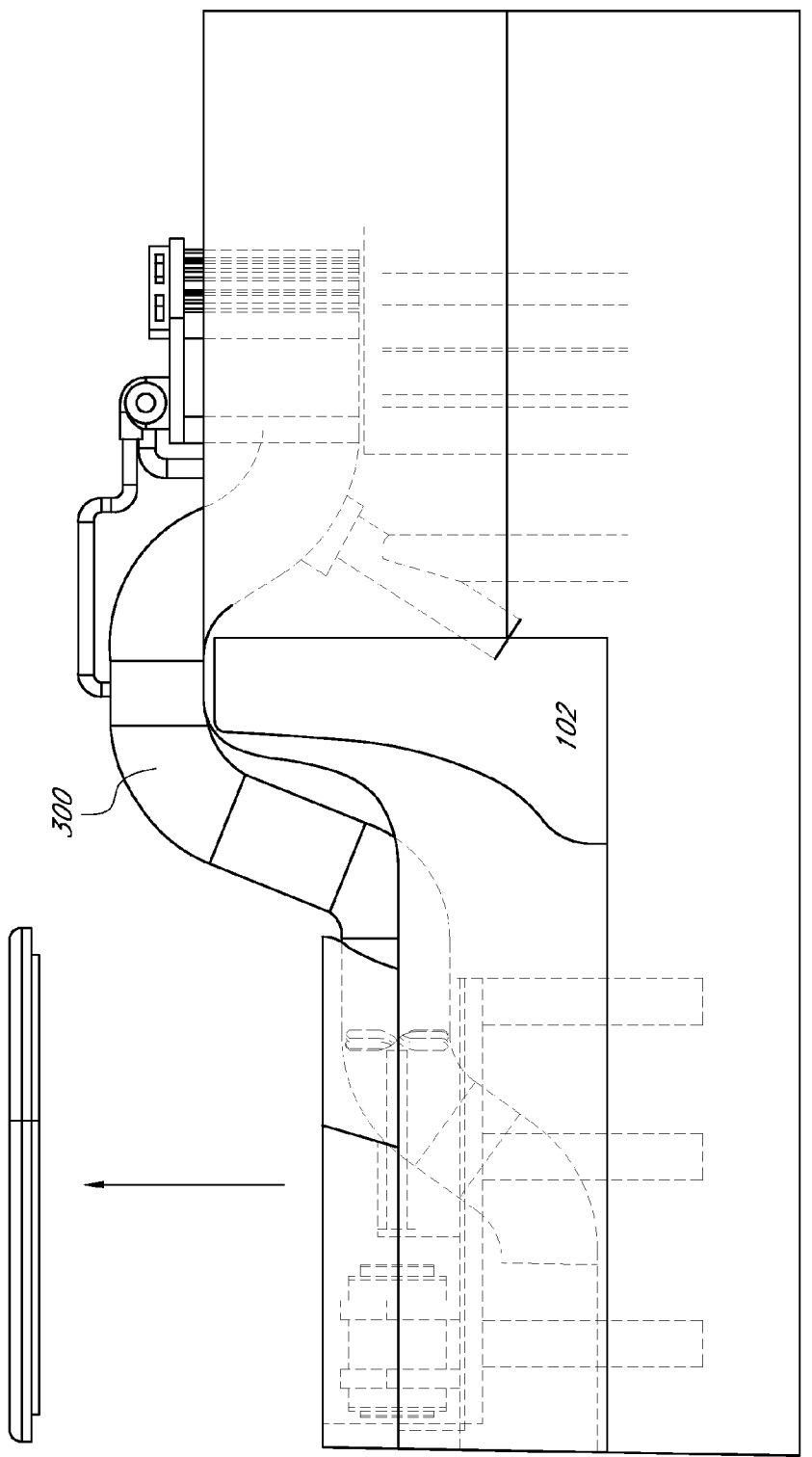
FIG. 7 is a side view of the hydroelectric generator system shown in FIG. 3.

FIG. 7 shows a side view of the system 300 when installed over a low-head dam 102. As shown in FIG. 7, the low profile design of the system 300 makes the system less obtrusive and blend in with the surrounding.

The compact, low profile turbine generator system of the preferred embodiments can also be utilized to harness the energy in pump discharge flow from reservoir pumping stations. In this application, the system is to be positioned in the flow of the pump discharge and adapted to utilize the kinetic energy in the pump discharge flow added to the potential energy available from the elevation drop between the upper and lower reservoirs to improve turbine output. This application provides an additional source of renewable energy that has been overlooked in the prior art. In one embodiment, the system can be installed at reservoir pumping stations instream of the pump discharge flow.

The compact, low profile hydro turbine system of certain preferred embodiments of the present invention combines the use of kinetic energy from the instream flow velocity to serve as "velocity heads" with the static steady head. In some embodiments, the system further utilizes vacuum technology to assist in siphoning flowing water over the dam, thus utilizing substantially all of the kinetic and potential energy available from the constant water overflow typically spilling over the dams between upstream and downstream. Thus the system is adapted to improve the total turbine outputs. In certain preferred embodiments, the system includes an optimized draft tube positioned on the downstream outlet for further improvement of the system performances. It enhances the suction at the discharge end and, therefore, reduces the instream pressure losses.

With respect to river flow velocity, most significant rivers and streams in USA are monitored by U.S. Geological Survey (USGS), which provides access to water data from over 1,500,000 gauge stations. In general, the river flow rates vary with seasonal cycles. River with a relative small drainage area may have shorter term cycles. Data was interpolated for two exemplary dams, Elgin Dam and Stolp Island East Dam. The data is shown in Tables 1 and 2 below.

TABLE 1

Flow duration data at Elgin Dam

| Time (%) | Flow (ft3/s) |
|---|---|
| 0% | 5034 |
| 5% | 3449 |
| 10% | 2476 |
| 15% | 2044 |
| 20% | 1799 |
| 25% | 1554 |
| 30% | 1337 |
| 35% | 1207 |
| 40% | 1091 |
| 45% | 999 |
| 50% | 912 |
| 55% | 838 |
| 60% | 748 |
| 65% | 675 |
| 70% | 602 |
| 75% | 545 |
| 80% | 477 |
| 85% | 416 |
| 90% | 356 |
| 95% | 297 |
| 100% | 185 |

TABLE 2

Flow duration data at Stolp Island East Dam

| Time (%) | Flow (ft3/s) |
|---|---|
| 0% | 3875 |
| 5% | 2573 |
| 10% | 1854 |
| 15% | 1530 |
| 20% | 1333 |
| 25% | 1156 |
| 30% | 992 |
| 35% | 896 |
| 40% | 811 |
| 45% | 746 |
| 50% | 678 |
| 55% | 621 |
| 60% | 553 |
| 65% | 500 |
| 70% | 447 |
| 75% | 402 |
| 80% | 351 |
| 85% | 306 |
| 90% | 263 |
| 95% | 223 |
| 100% | 135 |

A minimal flow over the dam, or residual flow, is typically required by FERC for most small hydro projects on existing dams. The ability to control the river flow increases the maximum energy production by the hydro system. There are several ways to control a river flow. The system of the preferred embodiments utilizes a control scheme that will have a very low environmental impact, low maintenance, good aesthetics, and low cost construction. The system preferably utilizes digital automatic control which provides such options as the selection of the optimal heights of spill water, in the heights of preferably one to two inches over the existing near 2 to 3 feet water over the dams. This will raise the upstream water level when the water intake is built just few inches below the river water surface. The siphoning technique also makes it possible to place the intake structure or penstock over the dam, which minimizes the impact on existing dams and increases the power output with an improved net head.

Although the foregoing description of the preferred embodiments of the present invention has shown, described and pointed out the fundamental novel features of the invention, it will be understood that various omissions, substitutions, and changes in the form of the detail of the invention as illustrated as well as the uses thereof, may be made by those skilled in the art, without departing from the spirit of the invention. Particularly, it will be appreciated that the preferred embodiments of the invention may manifest itself in other shapes and configurations as appropriate for the end use of the article made thereby.

What is claimed is:

1. A method of generating hydroelectric power, comprising:
   positioning a plurality of intakes instream a body of water, wherein the intakes are dispersed along a low-head dam, said intakes are positioned at or slightly above the top of the low-head dam so that water spilling over the low-head dam flows into the intake;
   positioning a turbine generator at an elevation below each intake, said turbine generator is in fluid communication with the respective intake, wherein the elevation difference creates a differential between head water and turbine generator;
   allowing water to flow into the intake to the turbine generator, wherein the kinetic energy in the directional flow of water coupled with the potential energy provided by the elevation drop between the intake and the turbine generator increase the turbine output;
   adjusting the elevation level of the intakes to accommodate various elevation levels of water spilling over the low-head dam so as to maximize capturing the kinetic energy in the directional flow of the water; and
   connecting the turbine generators in fluid communication with the dispersed intakes to an existing power grid.

2. The method of claim 1 further comprising using vacuum to siphon flowing water into the turbine generators.

3. The method of claim 1, wherein the intakes are positioned on the upstream side of the low-head dam and the turbine generators is are positioned on the downstream side of the low-head dam.

4. The method of claim 3, wherein the intakes are positioned adjacent to the river surface.

5. The method of claim 1, wherein the intakes are positioned at a depth where the water velocity is greater than the water velocity at or adjacent to a lower layer of the body of water by at least 10%.

6. The method of claim 1, wherein the intakes are positioned about 1-20 inches below a river surface.

7. The method of claim 1, wherein the intakes are positioned at a depth where the water flow velocity is between 500 to 5000 cubic feet per second.

8. The method of claim 1, wherein the body of water comprises pump discharge flow from a reservoir pumping station.

9. The system of claim 8 further comprising a vacuum system adapted to siphon water into the system.

10. The system of claim 8 further comprising grating adapted to keep debris from the entering the opening of the intake assembly.

11. The system of claim 8 further comprising a draft tube.

12. A compact hydroelectric generator system, comprising:
  low profile intake assembly, said intake assembly having an intake opening for water to flow through and a penstock having a substantially square, flat configuration at a proximal end and a circular configuration at a distal end, wherein the transition from the square and flat configuration to the circular configuration affects the vortex of the incoming water flow through the penstock such that velocity loss is substantially reduced; and
  a turbine chamber, wherein the turbine chamber houses a turbine and a generator and is in fluid communication with the intake assembly, said turbine chamber is adapted to be positioned at a lower elevation than that of the intake assembly.

* * * * *